US006828759B1

(12) United States Patent
Xiong et al.

(10) Patent No.: US 6,828,759 B1
(45) Date of Patent: Dec. 7, 2004

(54) CIRCUIT FOR REGULATING CURRENT TO MULTIPLE BATTERIES IN A BATTERY CHARGER

(75) Inventors: Seng P. Xiong, Dacula, GA (US); Martin H. Ramsden, Lawrenceville, GA (US); Marc B. Riley, Lawrenceville, GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/439,257

(22) Filed: May 15, 2003

(51) Int. Cl.[7] ................................................ H01M 10/46

(52) U.S. Cl. ....................................................... 320/116

(58) Field of Search ................................. 320/116, 128, 320/133, 137, 140, 145

(56) References Cited

U.S. PATENT DOCUMENTS

| | | | | | |
|---|---|---|---|---|---|
| 5,422,562 | A | * | 6/1995 | Mammano et al. | 323/282 |
| 5,610,451 | A | * | 3/1997 | Symonds | 307/66 |
| 5,912,549 | A | * | 6/1999 | Farrington et al. | 323/207 |
| 6,242,888 | B1 | | 6/2001 | Cerf | |
| 6,445,159 | B1 | | 9/2002 | Ramsden | |
| 2002/0008498 | A1 | * | 1/2002 | Tong | 320/141 |
| 2003/0141845 | A1 | * | 7/2003 | Krieger et al. | 320/132 |
| 2003/0201734 | A1 | * | 10/2003 | Krieger et al. | 315/291 |

* cited by examiner

*Primary Examiner*—Edward H. Tso
(74) *Attorney, Agent, or Firm*—Philip H. Burrus, IV

(57) ABSTRACT

A charging circuit for regulating current to a plurality of batteries is provided. The regulation is performed by a single control signal that is optionally scaled by resistor dividers. Switches coupled to the resistor dividers allow a microprocessor to actuate a particular resistor divider, thereby scaling the current flowing through a corresponding battery. As such, a single control signal, like a pulse width modulated signal, may be used to cause different currents to flow to different batteries, thereby leaving other output pins of the microprocessor open for other functions.

17 Claims, 2 Drawing Sheets

-PRIOR ART-

CIRCUIT FOR REGULATING CURRENT TO MULTIPLE BATTERIES IN A BATTERY CHARGER

BACKGROUND

1. Technical Field

This invention relates generally to battery charging devices, and more particularly to multiple battery charging devices for electronic devices.

2. Background Art

Portable computers, personal digital assistants (PDA's), cellular telephones, pagers, calculators, and other such electronic devices are commonplace in today's mobile society. One of the reasons these electronic devices are so popular is that they are portable, i.e. they provide a user with virtual freedom regarding the location of their use. Although these devices may be powered by plugging them into a standard AC outlet, AC power is often not convenient or accessible. Hence, batteries, by offering a portable source of power, provide portability and added utility to these electronic devices.

Although battery technology has progressed greatly in recent decades, a single battery is sometimes unable to meet a user's demands. For example, many cellular telephone service providers are offering plans with 3000 plus minutes of talk time or more per month. Some business people talk on their cellular phones six or more hours per day. Typical cellular telephone batteries provide only three to four hours of talk time before needing to be recharged. Consequently, some users carry two or more batteries with them so that a spare is ready when the first battery dies. To remain on the go, users now demand shorter charge times in addition to extended battery life. They also want to be able to quickly charge two or more batteries at the same time.

One solution to the problem of how to quickly recharge two or more batteries is to charge the batteries serially. In other words, when the two batteries are placed in the same charger, the charger completely charges the first battery. The charger then switches to the second battery and charges it. Total charging time is the charging time of one cell multiplied by the number of cells. Another solution to the problem with quickly recharging multiple batteries was to charge each battery in a charging system with its own power line or charging system.

Both prior art solutions, however, present problems. A problem with the first solution is that it is not efficient, in that it takes quite a long time to fully charge both batteries. The second solution is prohibitive in terms of both cost and the amount of space required for multiple charging circuits. For these reasons, there is a need for an adaptive multiple battery charging apparatus that allows simultaneous charging of multiple batteries with a single battery charging system.

DETAILED DESCRIPTION OF THE INVENTION

Figure 1:
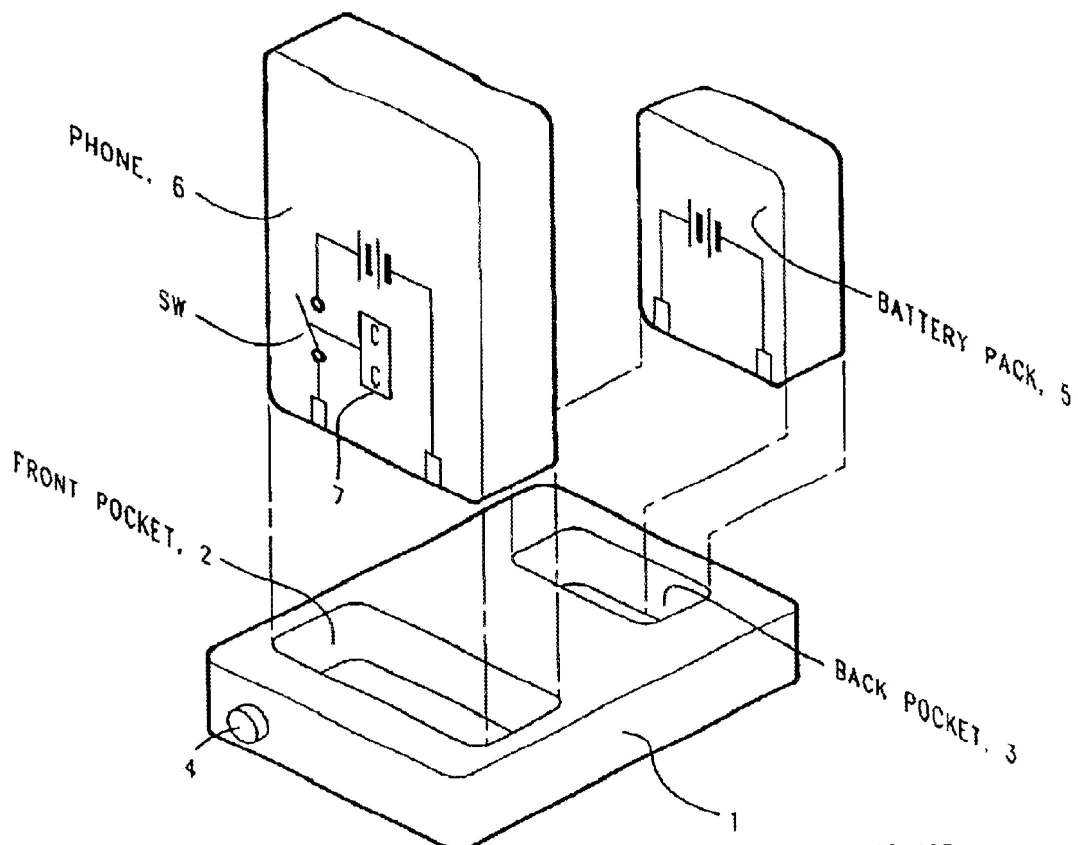
FIG. 1 illustrates a prior art charger.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Referring now to FIG. 1, illustrated therein is a prior art charger 1 having a front pocket 2 and a rear pocket 3. Typically the front pocket 2 is for receiving a portable electronic device like a cellular telephone 6, and the rear pocket 3 is for receiving just a spare battery module or pack 5. As such, the user may charge the battery pack that is coupled to the phone 6 by inserting the base of the phone 6 into the first pocket 2, while a spare battery pack 5 is installed within the second slot 3. A connection 4 is provided for coupling the charger 1 to a source of electric power. Some phones are also known that contain a safety switch (SW) in series with the battery, where the switch may be opened and closed by the circuitry 7 within the phone. It is not required that both slots 2 and 3 be used simultaneously, as one slot or the other could be used at any given time.

Figure 2:
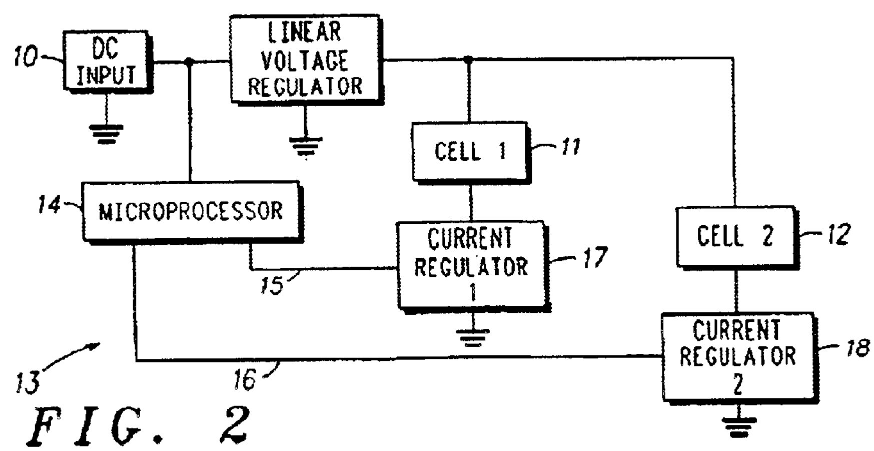
FIG. 2 illustrated a prior art charging circuit.

The typical charging circuit for such a charger 1 is shown in FIG. 2. A power source 10 with enough capacity to fully charge two batteries 11,12 is provided and coupled to the charging circuit 13. A microprocessor 14 having at least two analog outputs 15,16 drives a pair of corresponding current regulators 17, 18 to simultaneously charge the pair of cells.

This prior art charging circuit 13 is less than optimum, however, in that it is often difficult and expensive to dedicate two analog outputs 15,16 to current control. To begin, today's chargers are being asked to provide more and more functionality. As such, output pins for microprocessors are often required for fuel gauging, driving displays, channeling data, and other high-end functions. Thus, output pins are in high demand and are limited on any one microprocessor.

Second, microprocessors with multiple, on-board Digital to Analog (D/A) converters are expensive. While chargers are being asked to do more, customers are simultaneously demanding lower and lower prices. Thus, the addition of a microprocessor with multiple D/As is not conducive to manufacturing high performance, low cost chargers.

This invention solves this problem by providing a charging circuit capable of regulating charging current in two pockets simultaneously by using a single pulse width modulator (PWM). PWMs are switching outputs with variable duty cycles that are less expensive than analog outputs. For this reason, at least one PWM output is routinely found on even the least expensive microprocessors.

Figure 3:
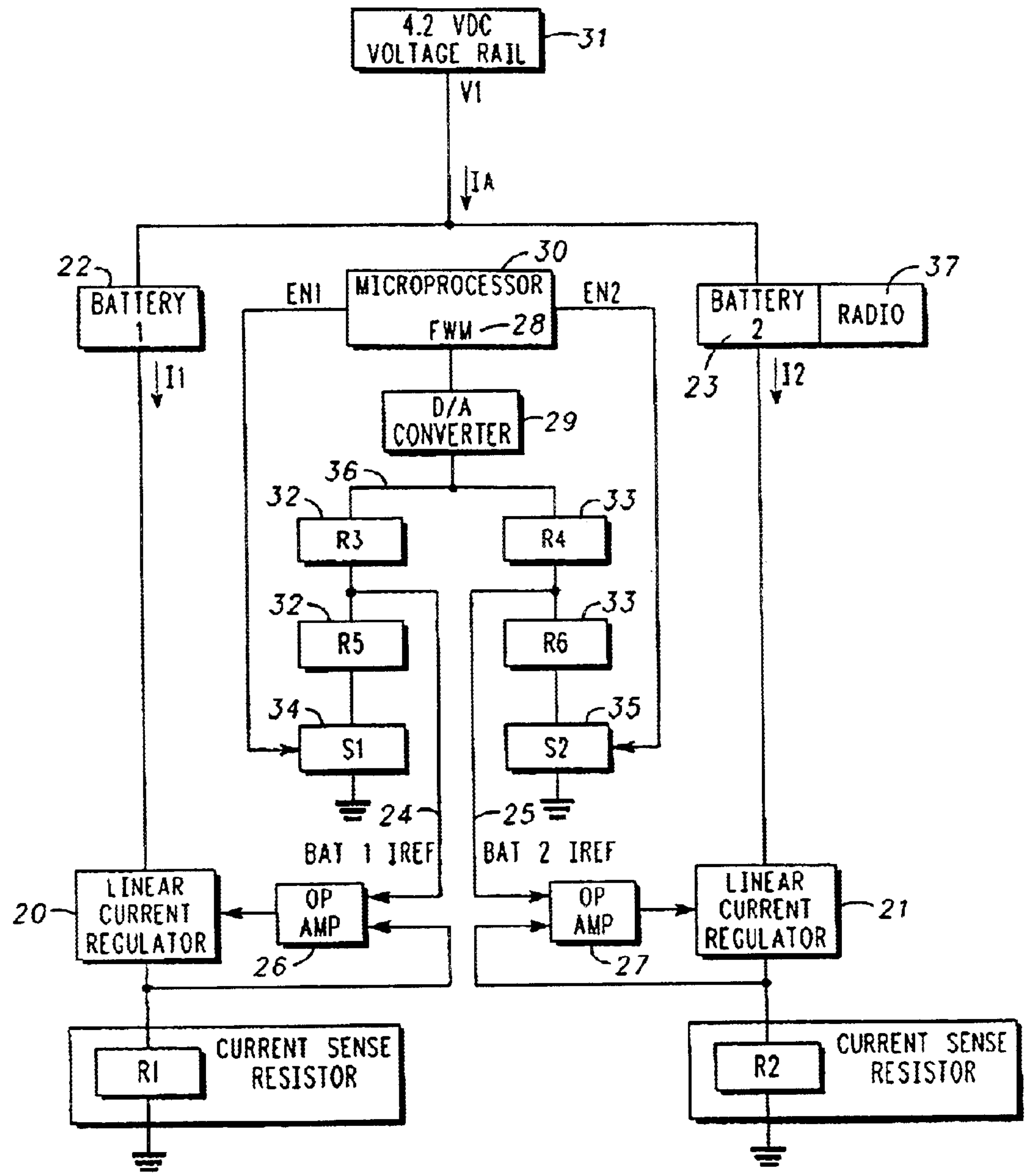
FIG. 3 illustrates a charging circuit in accordance with the invention.

Referring now to FIG. 3, illustrated therein is one preferred embodiment of a charging circuit in accordance with the invention. The circuit includes a first and second current regulators 20,21 that manage the current delivered to a pair of rechargeable batteries 22,23. The current regulators 20,21 may be as simple as a transistor operating in the ohmic, or linear, region.

The amount of charge current flowing through the batteries 22,23 is determined by a pair of reference signals 24,25 coupled through linear amplifiers 26,27 to the current regulators 20,21. The reference signals 24,25 derived from an adjustable control signal 28. The control signal 28 preferably comprises PWM signal 28 generated by the microprocessor 30 and coupled through a D/A converter 29. Note that while the D/A converter 29 may be any of a number of types known in the art, in this preferred embodiment the D/A converter comprises a series resistor and parallel capacitor. This R-C filter converts the modulating output to a "ripply"

DC level. Once the control signal 28 has been converted to a DC signal, it then becomes reference signals 24, 25 for use by the current regulators 20,21.

Adjustment of the magnitude of the reference signal 24 is achieved by way of a means for scaling the adjustable control signal. In this preferred embodiment, the means for scaling comprises a resistor divider 32 and a switch 34. The same is true for reference signal 25 by way of resistor divider 33 and switch 35. In this preferred embodiment, the switch 34 (or corresponding switch 35) comprises a transistor, although other applications may find it more suitable to employ other devices known in the art, like relays, circuit breakers, positive temperature coefficient devices, fuses, etc. Field Effect Transistors (FETs) are preferable due to their specified on impedance. If, for example, a bipolar transistor were used, the microprocessor 30 would need to compensate for any DC offset caused by current flowing through the bipolar transistor.

By opening and closing the switches 34,35, the microprocessor 30 may establish varying levels of current flowing through the batteries 22,23 for any given PWM duty cycle. The varying level is due to the scaling of the reference signal by way of voltage division created by the resistor dividers 32,33. To see how this is applied in practice, consider the following exemplary scenarios:

The first scenario occurs where there is a single battery present. When only one battery is present, all power supply current may be directed to that battery. For instance, if battery 22 is present and battery 23 is not, the PWM is set to a duty cycle that corresponds to the full power supply current. If the power supply can source 525 mA, for example, it is desirable for all 525 mA to flow through current regulator 20. When switch 34 is open, the output voltage 36 of the D/A converter 29 passes directly through to amplifier 26 (due to its high input impedance) resulting in a 525 mA current flowing through battery 22.

Another scenario occurs when two batteries are present, each with equal charging priority. (Some chargers may be programmed such that the battery coupled to the phone has a higher priority, and thus receives more charging current.) For instance, if battery 22 and battery 23 are both present with equal priority, these batteries should share the charging current equally. Using the 525 mA supply from above, the PWM would be set to a duty cycle half of that in the first scenario. Thus, by opening both switch 34 and switch 35, each battery 22,23 would receive 262 mA of charging current.

A third scenario occurs when two batteries are present and one of the batteries takes priority over the other. For example, assume that both battery 22 and battery 23 are present. Further assume that battery 23, being coupled to a radio 37, takes priority. (This can be the case because the radio 37 acts as a load. Consequently, the charger must provide more current to battery 23 to satisfy both charging requirements and radio load.)

In this scenario, the resistor dividers 32,33 provide a weighting factor that facilitates a higher level of current flowing through battery 23. Staying with the 525 mA exemplary power supply 31, the microprocessor 30 may set PWM 28 so as to request a current greater than half of the maximum. For discussion purposes assume that this level is 350 mA. By turning on switch 34, and turning off switch 35, more current will flow through battery 23 than battery 22. Battery 23 would receive the full 350 mA. Battery 22 would receive a current scaled down by a factor set by the resistor divider 32. This scaling factor may be any value between 0 and 1 of the designer's choosing.

Yet another scenario occurs when either of the batteries is in a state that requires a low current. One such example is known as an undervoltage condition. The undervoltage condition occurs when a battery has been discharged too deeply, such that the voltage of the battery has fallen below the manufacturer's recommended limits. In an undervoltage condition, a small current is to be applied until the voltage across the battery reaches the manufacturer's minimum limit. In such a scenario, the current in that battery may be reduced by actuating its corresponding switch. In so doing, the actuated switch causes the corresponding resistor divider to scale the reference signal, thereby reducing the current flowing through the corresponding battery. Meanwhile, the switch that has not been actuated allows a current equal to that requested by the control signal to flow through the corresponding battery.

For example, assume that battery 22 is in an undervoltage condition requiring no more than 100 mA. If all the resistors in the resistor dividers 32,33 are of equal value, the PWM 28 may be set to request a current of 200 mA. By closing switch 34 and opening switch 35, 100 mA flow through battery 22 and 200 mA flow through battery 23. Note that in each of the scenarios mentioned above, the batteries are always charged in parallel, and not sequentially. Note also that all current regulation is done by way of a single control signal.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims.

What is claimed is:

1. A circuit for charging multiple batteries, the circuit comprising:

a. a means for generating an adjustable control signal;

b. a means for regulating current;

c. a means for scaling the adjustable control signal, the means for scaling the adjustable control signal being coupled between the means for generating and the means for regulating; and d. a means of actuating the means for scaling;

wherein when the means of actuating is actuated, the means for scaling reduces the adjustable control signal by a factor between 0 and 1.

2. The circuit of claim 1, wherein the means for scaling the adjustable control signal comprises a resistor divider.

3. The circuit of claim 2, wherein the means for actuating the means for scaling comprises a switch.

4. The circuit of claim 3, wherein the switch is selected from the group consisting of transistors, relays, circuit breakers, positive temperature coefficient devices, and fuses.

5. The circuit of claim 4, wherein the means for generating an adjustable control signal comprises a microprocessor.

6. The circuit of claim 5, wherein the adjustable control signal comprises a pulse width modulated signal.

7. The circuit of claim 6, wherein the means of actuating is controllable by the microprocessor.

8. The circuit of claim 2, wherein the resistor divider comprises a first resistor coupled serially between the means for generating and the means for regulating, further comprising a second resistor coupled serially between the first resistor and the means for actuating.

9. The circuit of claim 8, wherein the means for actuating comprises a transistor coupled serially between the second resistor and a ground node.

10. A circuit for charging multiple batteries, the circuit comprising:

a. a means for generating an adjustable control signal;

b. at least two means for regulating current;

c. at least two means for scaling the adjustable control signal, the at least two means for scaling the adjustable control signal being coupled between the at least two means for generating and the at least two means for regulating, respectively; and d. at least two means of actuating the at least two means for scaling;

wherein when the means of actuating is actuated, the means for scaling reduces the adjustable control signal by a factor between 0 and 1.

11. The circuit of claim 10, wherein when a first battery and a second battery are coupled to the circuit, further wherein the first battery has priority over the second battery, a first means of actuating is actuated and a second means of actuating is not actuated.

12. The circuit of claim 11, wherein the at least two means for scaling the adjustable control signal comprise a first and a second resistor divider.

13. The circuit of claim 12, wherein the at least two means for actuating the means for scaling comprise a first and a second switch.

14. The circuit of claim 13, wherein the first and second switches are selected from the group consisting of transistors, relays, circuit breakers, positive temperature coefficient devices, and fuses.

15. The circuit of claim 14, wherein the means for generating an adjustable control signal comprises a microprocessor.

16. The circuit of claim 15, wherein the adjustable control signal comprises a pulse width modulated signal.

17. The circuit of claim 16, wherein the at least two means of actuating are controllable by the microprocessor.

* * * * *